(12) United States Patent
Yoon (10) Patent No.: US 8,568,913 B2
(45) Date of Patent: Oct. 29, 2013

(54) BATTERY MODULE

(75) Inventor: Ji-Hyoung Yoon, Yongin-si (KR)

(73) Assignees: Samsung SDI Co., Ltd., Giheung-gu, Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/156,130

(22) Filed: Jun. 8, 2011

(65) Prior Publication Data

US 2012/0231315 A1   Sep. 13, 2012

(30) Foreign Application Priority Data

Mar. 8, 2011   (KR) .................. 10-2011-0020448

(51) Int. Cl.
*H01M 10/50*   (2006.01)

(52) U.S. Cl.
USPC ............. 429/120; 429/11; 429/434; 429/442

(58) Field of Classification Search
USPC ....................................................... 429/120
See application file for complete search history.

(56) References Cited

U.S. PATENT DOCUMENTS

| | | | |
|---|---|---|---|
| 5,822,187 A * | 10/1998 | Garner et al. ............ | 361/679.27 |
| 6,122,166 A * | 9/2000 | Mochizuki et al. ...... | 361/679.52 |
| 6,653,002 B1 * | 11/2003 | Parise ............................... | 429/7 |
| 2005/0231983 A1 * | 10/2005 | Dahm ........................ | 362/800 |
| 2005/0242782 A1 | 11/2005 | Kadouchi et al. | |
| 2007/0029070 A1 * | 2/2007 | Yamamoto et al. ...... | 165/104.28 |
| 2010/0098977 A1 | 4/2010 | Ryu et al. | |
| 2011/0052961 A1 | 3/2011 | Lamm et al. | |
| 2011/0076541 A1 | 3/2011 | Meintschel et al. | |
| 2011/0104545 A1 | 5/2011 | Meintschel et al. | |

FOREIGN PATENT DOCUMENTS

| | | |
|---|---|---|
| JP | 2003341448 | 12/2003 |
| JP | 2004327223 | 11/2004 |
| JP | 2009-301877 | 12/2009 |
| KR | 10-2005-0018184 A | 2/2005 |
| KR | 10-2005-0018518 A | 2/2005 |
| KR | 10-2010-0043806 A | 4/2010 |

OTHER PUBLICATIONS

Korean Office action issued by KIPO on Sep. 11, 2012 in connection with Korean Patent Application Serial No. 10-2011-0020448 and Request for Entry of the Accompanying Office Action attached herewith.

* cited by examiner

*Primary Examiner* — Barbara Gilliam
*Assistant Examiner* — Gary Harris
(74) *Attorney, Agent, or Firm* — Robert E. Bushnell, Esq.

(57) ABSTRACT

A battery module capable of improving low-temperature performance and heat dissipation characteristics. The battery module includes a plurality of battery cells and a heat conducting member. The plurality of battery cells are aligned in one direction. The heat conducting member is interposed between the neighboring battery cells, and has at least one electronic element that generates a change in temperature of the battery cells.

16 Claims, 7 Drawing Sheets

BATTERY MODULE

CLAIM OF PRIORITY

This application makes reference to, incorporates the same herein, and claims all benefits accruing under 35 U.S.C. §119 from an application earlier filed in the Korean Intellectual Property Office on Mar. 8, 2011 and there duly assigned Serial No. 10-2011-0020448.

BACKGROUND OF THE INVENTION

1. Field of the Invention

An aspect of the present invention relates to a battery module capable of improving low-temperature performance and heat dissipation characteristics.

2. Description of the Related Art

In general, secondary batteries are rechargeable and can be repeatedly used. The secondary batteries may be implemented as a battery cell used for portable small-sized electronic devices such as a cellular phone, a desktop computer, a laptop computer, a camera and camcorder. Alternatively, the secondary batteries may be implemented as a battery pack including a plurality of battery cells, used as a power source for driving motors of a high-power hybrid electric vehicle (HEV), an electric vehicle (EV), and the like.

The battery module used as a power source for driving high-power motors generates a large amount of heat due to a charge or discharge operation, and the generated heat may deteriorate the battery cells. Therefore, it is required to develop a battery module with a structure having improved heat dissipation characteristics.

A lithium-ion containing battery cell has a disadvantage in that since its low-temperature resistance is large, low-temperature performance such as cold cranking is degraded. Therefore, it is required to develop a technique capable of performing the cold cranking by increasing the temperature of a battery as well as cooling of the battery.

SUMMARY OF THE INVENTION

Embodiments provide an improved battery module.

Embodiments also provide a battery module capable of improving low-temperature performance and heat dissipation characteristics.

According to an aspect of the present invention, there is provided a battery module constructed with a plurality of battery cells aligned in one direction, and a heat conducting member interposed between the neighboring battery cells. The heat conducting member may be constructed with at least one electronic element that generates a change in temperature of the battery cells.

The battery module may further include a heat dissipation member that comes in contact with at least a portion of the heat conducting member so that heat generated from the battery cells is transferred to an exterior of the battery cells.

The heat dissipation member may be further provided with a heat dissipation plate on an opposite surface to a contact surface with the heat conducting member.

The heat dissipation member may be a liquid cooling plate having a liquid coolant filled therein.

The heat conducting member may include at least two first and second heat conducting portions separated from each other with the electronic element interposed therebetween.

The first and second heat conducting portions may have different electrical polarities from each other.

The first and second heat conducting portions may be provided with first and second bent portions formed by bending the first and second conducting portions, respectively.

At least portions of the neighboring first bent portions may come in contact with each other so as to be electrically connected to each other, and at least portions of the neighboring second bent portions may come in contact with each other so as to be electrically connected to each other.

The first and second bent portions may come in contact with the heat dissipation member.

The battery module may further include a base plate interposed between the heat dissipation member and the first and second bent portions.

The base plate may be provided with first and second cut-away portions into which the first and second bent portions are inserted, respectively.

The first and second bent portions may be bent in the same direction.

The first and second bent portions may be bent in opposite directions to each other.

The battery module may further include a connection member that fixes the battery cells and the heat conducting members.

The battery module may further include a housing fastened to the heat dissipation member or the base plate so as to accommodate the plurality of battery cells.

The heat conducting member may be provided so that at least a portion of the heat conducting member is attached to an insulating member.

The heat conducting member may be made of a material containing graphite.

The electronic element may be a heat generating element.

The heat generating member may be made of at least one selected from the group consisting of Ni, Cr, W, Cu, Mo, Si, Al and Nb.

The surface of the heat dissipation member or the heat conducting member may be subjected to insulation processing through anodizing.

As described above, according to embodiments of the present invention, it is possible to provide a battery module capable of improving low-temperature performance and heat dissipation characteristics.

Further, it is possible to provide a battery module in which a heat generating element with a simple shape is provided between battery cells, so that cold cranking is possible.

Furthermore, in the charge or discharge of the battery cell, heat generated from the battery cell is rapidly transferred to the side of a heat dissipation member, so that it is possible to improve the cooling efficiency of the battery cell.

Accordingly, it is possible to provide a battery module in which a battery cell is not easily deteriorated even though it is charged/discharged a plurality of times.

BRIEF DESCRIPTION OF THE DRAWINGS

A more complete appreciation of the invention, and many of the attendant advantages thereof, will be readily apparent as the same becomes better understood by the reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, embodiments of the present invention will be described in detail with reference to the accompanying drawings.

First, a battery module constructed as an embodiment according to the principles of the present invention will be described with reference to FIGS. 1 to 2C.

Figure 1:
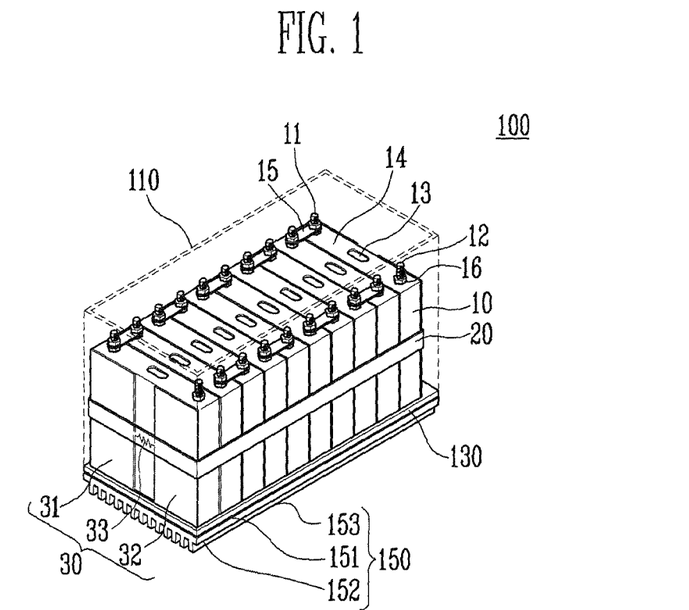
FIG. 1 is a perspective view schematically showing a battery module according to an embodiment of the present invention.
Figure 2A:
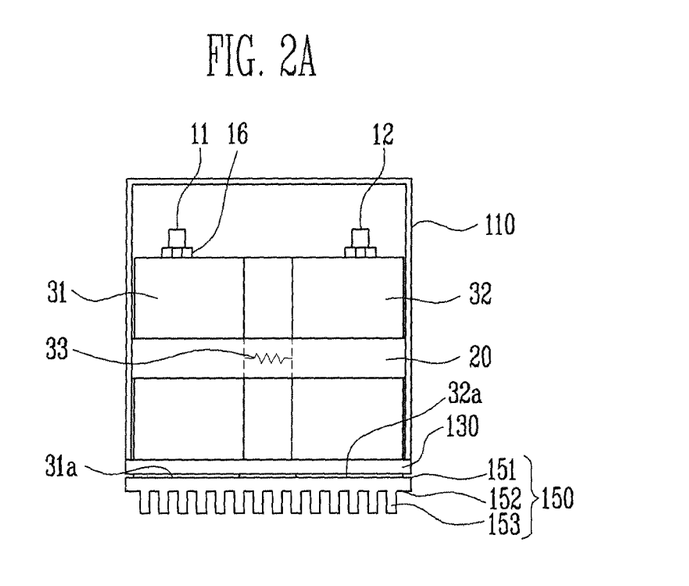
FIGS. 2A and 2B are front and side views of FIG. 1, respectively.
Figure 2B:
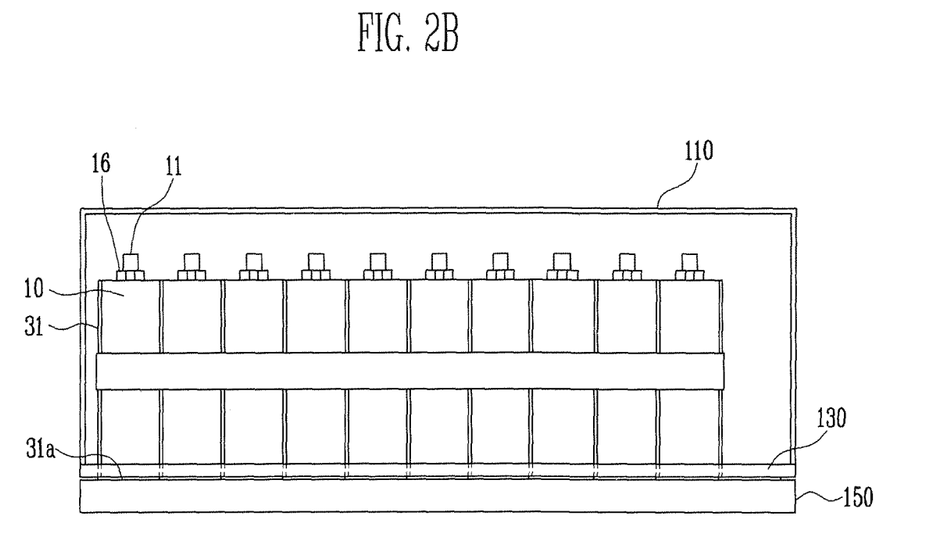
Figure 2C:
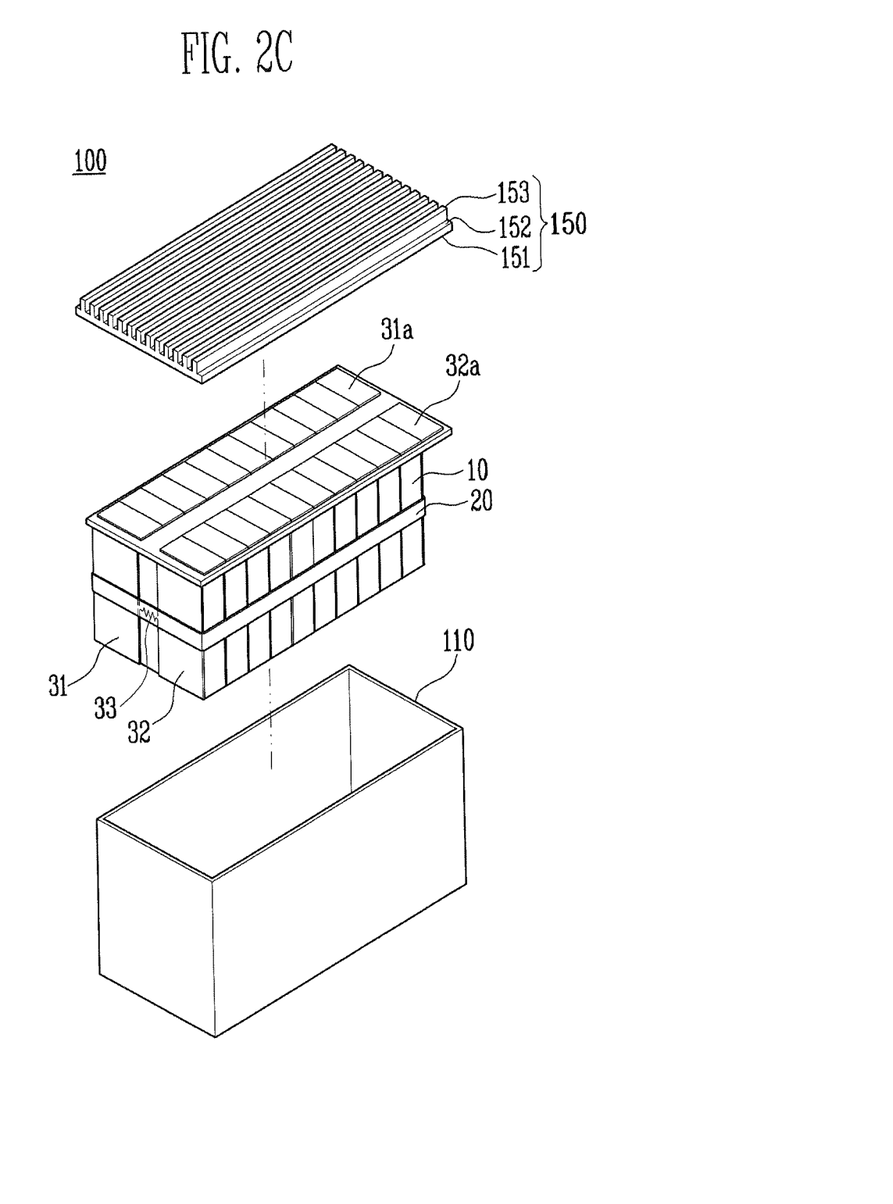
FIG. 2C is an exploded perspective view schematically showing a bottom of FIG. 1.

FIG. 1 is an oblique view schematically showing a battery module constructed as an embodiment according to the principles of the present invention. FIGS. 2A and 2B are front and side views of the battery module of FIG. 1, respectively. FIG. 2C is an exploded oblique view schematically showing a bottom of the battery module of FIG. 1.

Battery module 100 constructed this embodiment includes a plurality of battery cells 10 aligned in one direction, and a heat conducting member 30 having at least one electronic element 33 that is interposed between neighboring battery cells 10 and generates a change in temperature of battery cells 10.

Here, battery module 100 according to this embodiment may further include a heat dissipation member 150. Heat dissipation member 150 comes in contact with at least a portion of heat conducting member 30 so that heat generated from battery cell 10 in charge or discharge operation is transferred to an exterior of battery cell 10.

Heat dissipation member 150 is further provided with a heat dissipation plate 153 formed on an opposite surface 152 to a contact surface 151 with heat conducting member 30. That is, surface 152 of heat dissipation member 150 is opposite to surface 151 which is in contact with heat conducting member 30. The shape of heat dissipation plate 153 may be the shape of a heat dissipation fin as illustrated in this embodiment. However, the shape of heat dissipation plate 153 is not limited thereto, and may be variously modified, if necessary. Heat dissipation member 150 may have the shape of a liquid cooling plate having a liquid coolant filled in the interior thereof.

The surfaces of heat dissipation member 150 are subjected to insulation processing through anodizing. The anodizing is a post-process method in which an oxide film produced by intentionally oxidizing/corroding the surface of a metallic material functions to protect a product from external influence. The anodizing is a processing method for obtaining strong abrasion resistance and electrical insulation properties by coating a strong electrochemical ceramic film on the surface of a metallic material. For example, a rough, porous and transparent oxide layer may be formed on the surface of aluminum (Al) by immersing the aluminum in a chemical solution and electrically oxidizing the aluminum.

Hereinafter, the heat conducting member according to an embodiment of the present invention will be described in detail with reference to FIGS. 3A to 3C.

Figure 3A:
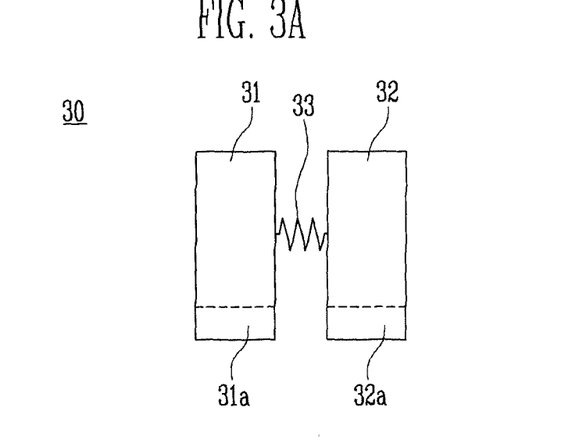
FIG. 3A is a sectional view schematically showing a heat conducting member included in the battery module according to one embodiment of the present invention.

FIG. 3A is a sectional view schematically showing a heat transfer member, i.e., a heat conducting member, included in the battery module constructed as one embodiment according to the principles of the present invention. FIG. 3B is a sectional view schematically showing a heat conducting member included in the battery module constructed as another embodiment according to the principles of the present invention. FIG. 3C is a sectional view schematically showing a heat conducting member included in the battery module constructed as still another embodiment according to the principles of the present invention.

Referring to FIG. 3A, heat conducting member 30 constructed as one embodiment according to the principles of the present invention includes first and second heat conducting portions 31 and 32 separated from each other with an electronic element 33 interposed therebetween. First and second heat conducting portions 31 and 32 have different electrical polarities from each other. For example, if first heat conducting portion 31 has a negative (−) polarity, second heat conducting portion 32 has a positive (+) polarity. If first heat conducting portion 31 has a positive (+) polarity, second heat conducting portion 32 has a negative (−) polarity. A first bent portion 31a is provided at a portion at which first heat conducting portion 31 comes in contact with heat dissipation member 150, and a second bent portion 32a is provided at a portion at which second heat conducting member 32 comes in contact with heat dissipation member 150.

Figure 3B:
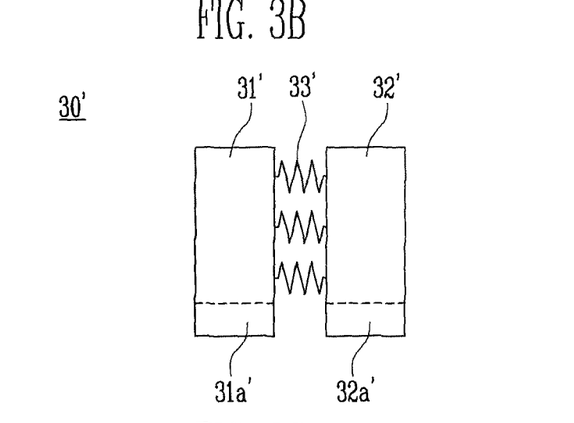
FIG. 3B is a sectional view schematically showing a heat conducting member included in the battery module according to another embodiment of the present invention.

Referring to FIG. 3B, heat conducting member 30' constructed as the another embodiment according to the principles of the present invention includes first and second heat conducting portions 31' and 32' separated from each other with more than one electronic element 33' interposed therebetween. First and second heat conducting portions 31' and 32' have different electrical polarities from each other. A first bent portion 31a' is provided at a portion at which first heat conducting portion 31' comes in contact with heat dissipation member 150, and a second bent portion 32a' is provided at a portion at which second heat conducting member 32' comes in contact with heat dissipation member 150.

Figure 3C:
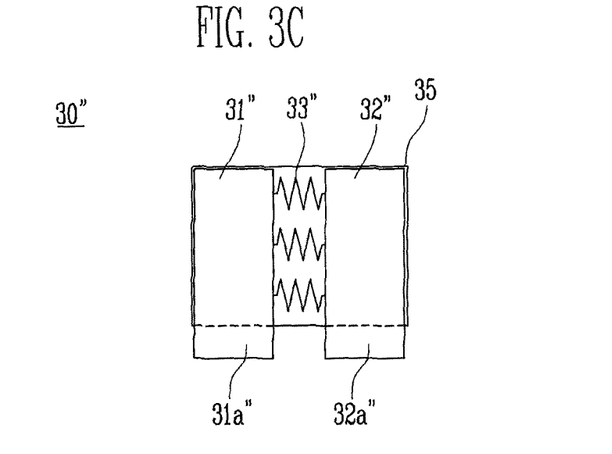
FIG. 3C is a sectional view schematically showing a heat conducting member included in the battery module according to still another embodiment of the present invention.

Referring to FIG. 3c, heat conducting member 30" constructed as the still another embodiment according to the principles of the present invention includes first and second heat conducting portions 31" and 32" separated from each other with more than one electronic element 33" interposed therebetween. Portions of electronic element 33", first heat conducting portion 31" and second heat conducting portion 32" are attached to an insulating member 35. Similarly, first and second heat conducting portions 31" and 32" have different electrical polarities from each other. A first bent portion 31a" is provided at a portion at which first heat conducting portion 31" comes in contact with heat dissipation member 150, and a second bent portion 32a" is provided at a portion at which second heat conducting member 32" comes in contact with heat dissipation member 150. Here, first and second bent portions 31a" and 32a" of heat conducting member 30" are not attached to insulating member 35. This is because if first and second bent portions 31a" and 32a" are attached to insulating member 35 and then bent, first and second bent portions 31a" and 32a" cannot come in contact with neighboring first and second bent portions 31a" and 32a", respectively.

Heat conducting member 30, 30' or 30" interposed between the neighboring battery cells 10 is made of a material such as graphite having high heat conductivity. Accordingly, in the charge or discharge operation of the battery cell, heat conducting member 30, 30' or 30" rapidly transfers heat generated from battery cell 10 to the side of heat dissipation member 150, thereby cooling battery cell 10.

Hereinafter, a battery module constructed as an embodiment according to the principles of the present invention will be described in detail with reference to FIGS. 4A to 5.

Figure 4A:
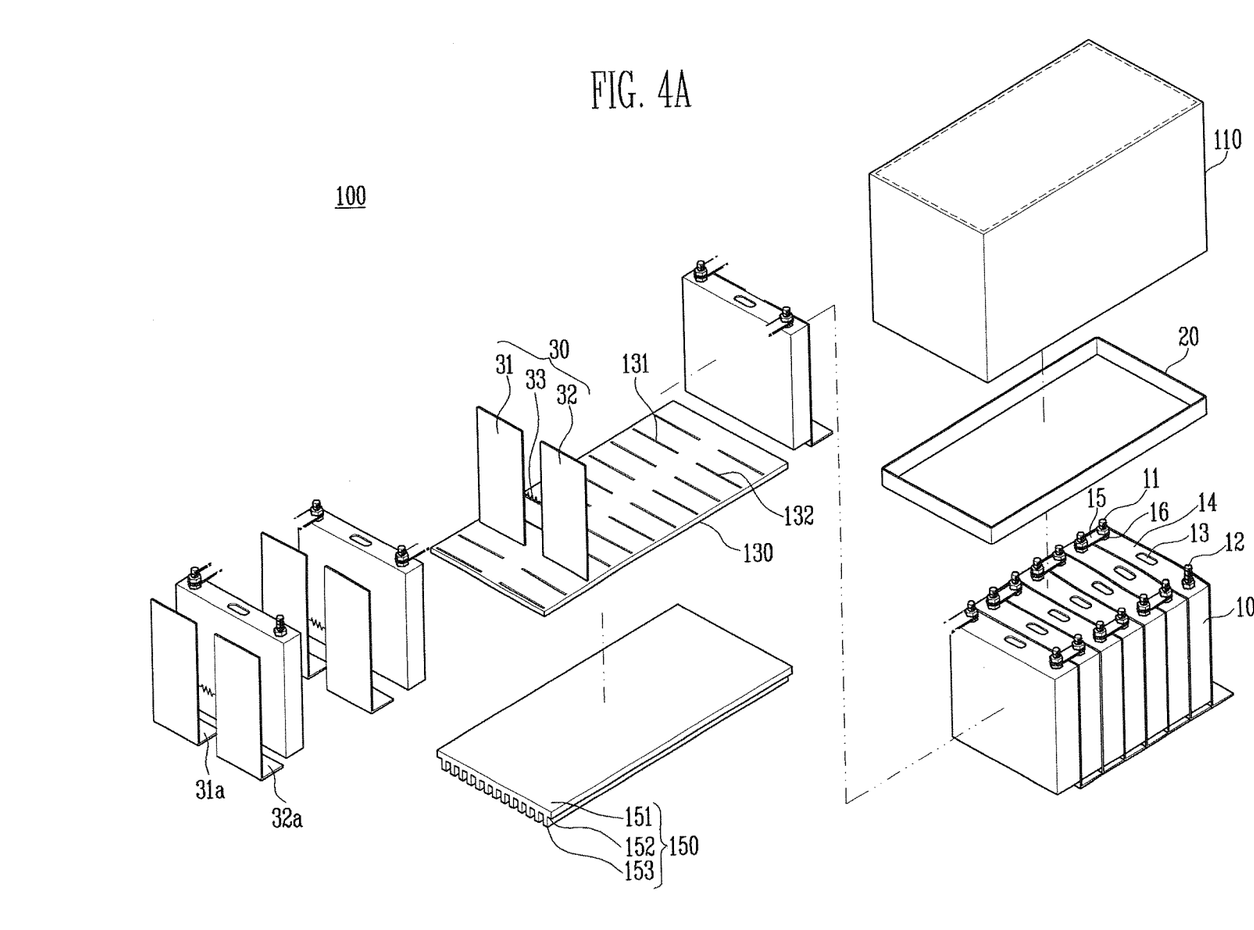
FIG. 4A is an exploded perspective view of a battery module according to one embodiment of the present invention.

FIG. 4A is an exploded oblique view of a battery module constructed as one embodiment according to the principles of the present invention. FIG. 4B is an exploded oblique view of a battery module constructed as another embodiment according to the principles of the present invention. FIG. 5 is a schematic view schematically showing a relation among a heat conducting member, a binary management system (BMS) and a power supply unit, which are included in a battery module according to an embodiment of the present invention.

Battery module 100 includes a plurality of battery cells 10 aligned in one direction, and each of the battery cells is provided with positive and negative electrode terminals 11 and 12. Battery cells 10 are aligned so that wide surfaces of neighboring battery cells 10 are opposite to each other.

Each of battery cells 10 that constitute battery module 100 may be manufactured by accommodating an electrode assembly and an electrolyte in a battery case and then sealing the battery case in which the electrode assembly is accommodated using a cap plate 14. Here, the electrode assembly includes a positive electrode plate, a negative electrode plate and a separator interposed between the electrode plates. Cap plate 14 may be provided in the state that positive electrode terminal 11 connected to the positive electrode plate and negative electrode terminal 12 connected to the negative electrode plate are protruded to the exterior thereof. Here, the positive and negative electrode plates generate electrochemical energy through a reaction between the electrolyte and the positive and negative electrode plates, and the generated energy is transferred to the exterior of battery cell 10 through positive and negative electrode terminals 11 and 12. A vent 13 is provided between positive and negative electrode terminals 11 and 12 so as to serve as a path through which a gas is exhausted to the exterior of battery cell 10.

Positive and negative terminals 11 and 12 of two neighboring battery cells 10 may be electrically connected to each other through a bus-bar 15. Bus-bar 15 is provided with holes through which the positive and negative electrode terminals 11 and 12 can pass, respectively. Bus-bar 15 to which the terminals are connected by passing through the holes may be fixed by members such as nuts 16.

Here, heat conducting members 30 interposed between the respective battery cells 10 are fixed by connection member 20. Housing 110 is fastened to heat dissipation member 150 or base plate 130 so as to accommodate the plurality of battery cells 10.

In this embodiment, battery cell 10 will be described as a prismatic lithium ion secondary battery. However the present invention is not limited thereto, and may be applied to various types of batteries such as a lithium polymer battery and a cylindrical battery.

A heat conducting member 30 that may be implemented in various shapes as described above is interposed between neighboring battery cells 10. As described above, heat conducting member 30 includes first and second heat conducting portions 31 and 32 separated from each other with an electronic element 33. First and second heat conducting portions 31 and 32 have different electrical polarities from each other. Heat conducting member 30 is provided with first and second bent portions 31a and 32a that come in contact with a contact surface 151 of heat dissipation member 150. Meanwhile, a base plate 130 is further provided between heat dissipation member 150 and first and second bent portions 31a and 32a. First and second cut-away portions 131 and 132 are provided to base plate 130. First and second bent portions 31a and 32a are inserted into first and second cut-away portions 131 and 132, respectively. First and second cut-away portions 131 and 132 are incision portions, i.e., narrow cuts or openings into which the first and second bent portions 31a and 32a are inserted, respectively. Then, first and second bent portions 31a and 32a are bent using a pressure means such as a roller so as to respectively come in contact with neighboring first and second bent portions 31a and 32a. Thus, first bent portions 31a are bent to electrically connect to one another, and second bent portions 32a are bent to electrically connect to one another. The surface of base plate 130 is subjected to insulation processing through anodizing.

Referring to FIG. 4A, in heat conducting member 30 constructed as the one embodiment of the present invention, first and second bent portions 31a and 32a are bent in the same direction so as to respectively come in contact with neighboring first and second bent portions 31a and 32a.

Figure 4B:
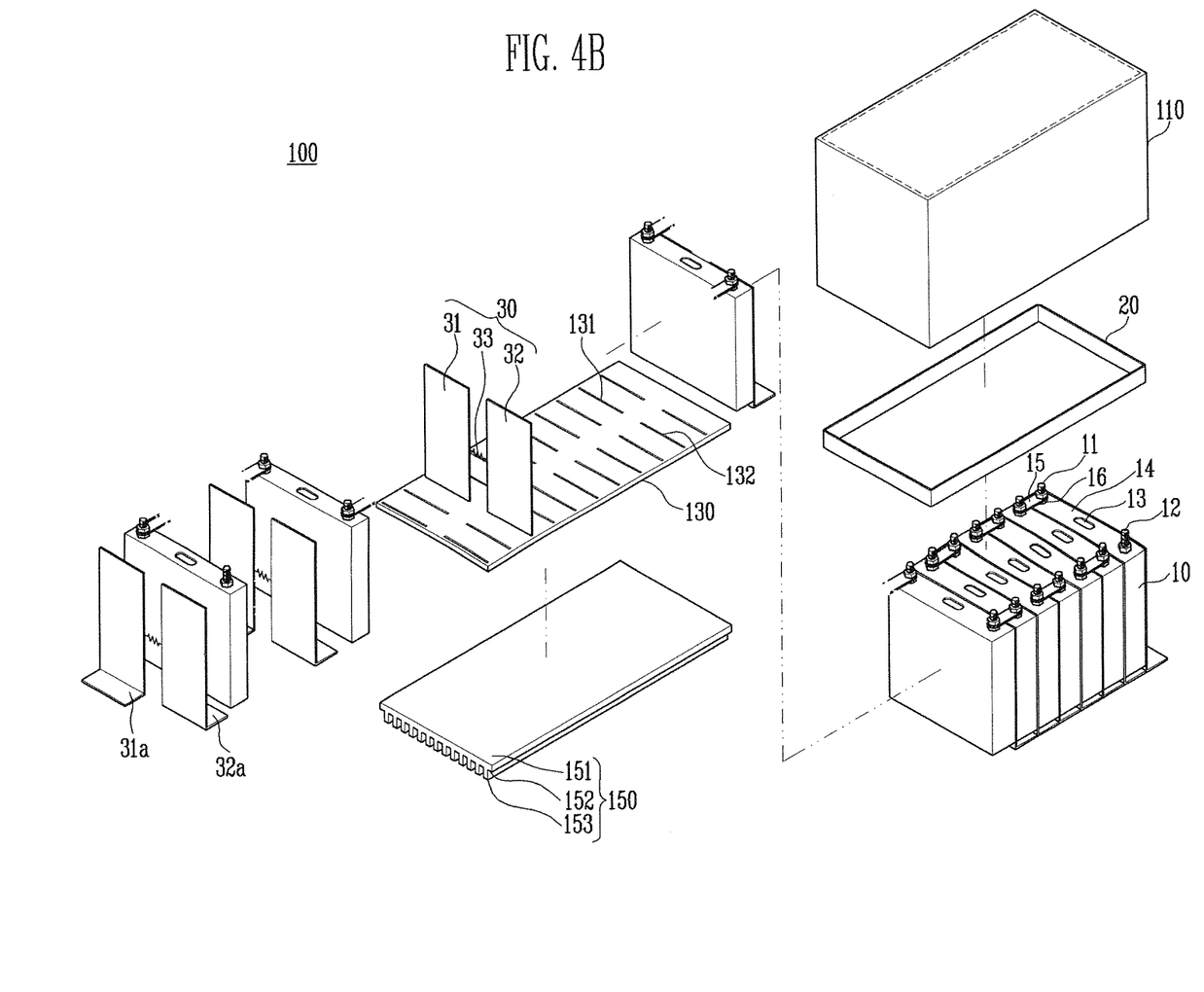
FIG. 4B is another exploded perspective view of a battery module according to another embodiment of the present invention.

Referring to FIG. 4B, in heat conducting member 30 constructed as the another embodiment of the present invention, first and second bent portions 31a and 32a are bent in opposite directions to each other so as to respectively come in contact with neighboring first and second bent portions 31a and 32a.

Since a battery containing lithium ions generally has a large low-temperature resistance, the low-temperature performance of cold cranking or the like is degraded. Therefore, it is required to develop a technique that enables cold cranking to be performed by increasing the temperature of the battery in addition to cooling.

Heat conducting member 30 constructed as this embodiment is provided with a coil made of nichrome or tungsten or electronic element 33 that is a thin-film heat generating element, so that it is possible to increase the temperature of battery cells 10 for a short period of time. The heat generating member may be made of at least one selected from the group consisting of Ni, Cr, W, Cu, Mo, Si, Al and Nb.

Meanwhile, heat conducting member 30 is made of a material such as graphite having high heat conductivity. Accordingly, in the charge or discharge operation of battery cell 10, heat conducting member 30 rapidly transfers heat generated from battery cell 10 to the side of heat dissipation member 150, thereby cooling battery cell 10.

Figure 5:
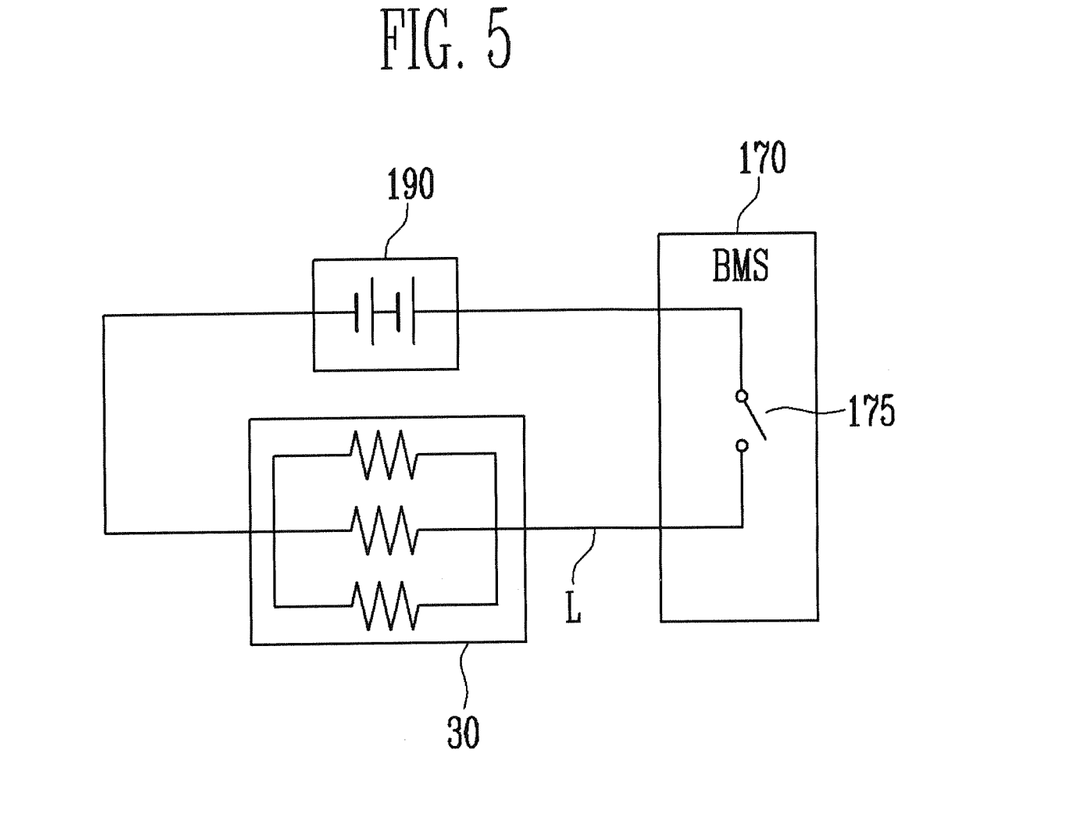
FIG. 5 is a schematic view schematically showing a relation among a heat conducting member, a binary management system (BMS) and a power apply unit, which are included in a battery module according to an embodiment of the present invention.

Referring to FIG. 5, heat conducting members 30 having opposite polarities are electrically connected to a switching element 175 of BMS 170 and a power supply 190 through an electric wire L. The heat generation of electronic element 33 may be performed or stopped by turning on or off switching element 175. Thus, it is possible to actively control the presence of heat generation of electronic element 33 according to the sensed temperature of battery cell 10.

According to the embodiments of the present invention, it is possible to provide a battery module capable of improving low-temperature performance and heat dissipation characteristics.

Further, it is possible to provide a battery module in which a heat generating element with a simple shape is provided between battery cells, so that cold cranking is possible.

Furthermore, in the charge or discharge of the battery cell, heat generated from the battery cell is rapidly transferred to the side of a heat dissipation member, so that it is possible to improve the cooling efficiency of the battery cell.

Accordingly, it is possible to provide a battery module in which a battery cell is not easily deteriorated even though it is charged/discharged for a plurality of times.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module having a housing, comprising:
   a plurality of battery cells aligned in one direction and entirely contained within said housing; and
   a heat conducting member entirely contained in said housing and interposed between neighboring battery cells of the plurality of battery cells, the heat conducting member having at least one electronic element that generates a change in temperature of the battery cells,
   the heat conducting member comprising a first and second heat conducting portion separated from and not coming in direct contact with each other, the electronic element is in direct contact with and positioned between and not contained within the first and second portion with no intervening structures,
   the electronic element being a heat generating element that generates heat by electrically connecting to an electrical power supply, and
   a heat dissipation member that comes in contact with at least a portion of the heat conducting member so that heat generated from the battery cells is transferred to an exterior of the battery cells,
   wherein the surface of at least one of the heat dissipation member and the heat conducting member has been anodized, and
   wherein the first heat conducting portion is applied with a first electrical potential, and the second heat conducting portion is applied with a second electrical potential, the first and second electrical potentials having different electrical polarities from each other.

2. The battery module according to claim 1, wherein the heat dissipation member is further provided with a heat dissipation plate on an opposite surface to a contact surface with the heat conducting member.

3. The battery module according to claim 1, wherein the heat dissipation member is a liquid cooling plate having a liquid coolant filled therein.

4. The battery module according to claim 1, wherein the first heat conducting portion comprises a first bent portion formed by bending a portion of the first conducting portion, and the second heat conducting portion comprises a second bent portion formed by bending a portion of the second heat conducting portion.

5. The battery module according to claim 4, wherein at least portions of the neighboring first bent portions come in contact with each other so as to be electrically connected to each other, and at least portions of the neighboring second bent portions come in contact with each other so as to be electrically connected to each other.

6. The battery module according to claim 4, wherein the first and second bent portions come in contact with the heat dissipation member.

7. The battery module according to claim 4, further comprising a base plate interposed between the heat dissipation member and the first and second bent portions.

8. The battery module according to claim 7, further comprising a housing fastened to one of the heat dissipation member and the base plate so as to accommodate the plurality of battery cells.

9. The battery module according to claim 7, wherein the base plate is provided with first and second cut-away portions into which the first and second bent portions are inserted, respectively.

10. The battery module according to claim 4, wherein the first and second bent portions are bent in the same direction.

11. The battery module according to claim 4, wherein the first and second bent portions are bent in opposite directions to each other.

12. The battery module according to claim 1, further comprising a connection member that fixes the battery cells and the heat conducting members.

13. The battery module according to claim 1, wherein the heat conducting member is provided so that at least a portion of the heat conducting member is attached to an insulating member.

14. The battery module according to claim 1, wherein the heat conducting member is made of a material containing graphite.

15. The battery module according to claim 1, wherein the electronic element is a heat generating element.

16. The battery module according to claim 15, wherein the heat generating member is made of at least one selected from the group consisting of Ni, Cr, W, Cu, Mo, Si, Al and Nb.

* * * * *